United States Patent Office 3,647,921
Patented Mar. 7, 1972

---

3,647,921
AROMATIC SUPERPOLYESTER-STYRENE POLYMER MELT STABILIZED COMPOSITION
Alvin F. Berry, Center Berlin, N.Y., assignor to General Electric Company
No Drawing. Filed Mar. 18, 1970, Ser. No. 20,826
Int. Cl. C08g 39/10, 51/28
U.S. Cl. 260—873
10 Claims

ABSTRACT OF THE DISCLOSURE

The invention relates to an aromatic, substantially linear superpolyester possessing substantially improved melt stability properties. The polyesters contemplated by the invention are of an aromatic dicarboxylic acid and a dihydric phenol, and preferably polyesters having p-phenylene isophthalate units alone or interspersed with p-phenylene terephthalate units. Such polyesters are stabilized in accordance with the invention by addition of a styrene polymer in an amount sufficient to provide preferably from about 1 to 10% by weight styrene in the polyester composition.

BACKGROUND OF THE INVENTION

(1) Introduction

This invention relates to mixed synthetic resins and more particularly, to a mixed synthetic resin containing a minor amount of a styrene polymer and a major amount of a linear, aromatic superpolyester of a dicarboxylic acid and a dihydric phenol.

(2) Description of the prior art

Substantially linear, wholly aromatic superpolyesters are well known in the art and described in numerous references including U.S. Pats. Nos. 3,036,990; 3,036,991; 3,036,992; 3,160,602; 3,160,603; 3,160,604; and 3,160,605; all incorporated herein by reference. These superpolyesters are high performance, engineering thermoplastics having many desirable physical, chemical and electrical properties. However, their use has been somewhat limited due to molding difficulties as a result of the polyesters being only marginally stable in the melt. Thus, in a molding operation such an extrusion, at the high temperatures required, typically between 400 and 450° C., the polyesters tend to cross-link and gel. This results in a loss of the desired properties of the polyesters and frequently, damage to the molding equipment.

STATEMENT OF THE INVENTION

In accordance with the present invention, it has been unexpectedly found that the melt stability of the aforesaid linear, aromatic superpolyesters can be greatly improved and the above-described problems eliminated by addition of a minor amount of a styrene polymer. The particular styrene polymer used does not appear to be critical though the styrene content of the polyester composition is preferably maintained between about 1 and 10% by weight of the total composition.

DESCRIPTION OF THE PREFERRED EMBODIMENT

The linear, aromatic polyesters contemplated by the invention are of a dihydric phenol and a dicarboxylic acid and have an intrinsic viscosity of at least 0.3 deciliter/gram (dl./g.) as measured in 2,4,6-trichlorophenol at 75° C. Typical examples of some of the dihydric phenols suitable for purposes of the invention include, for example, hydroquinone, catechol, resorcinol, the dihydroxybiphenyls, e.g., 2,2'-dihydroxybiphenyl, 3,3'-dihydroxybiphenyl, 4,4'-dihydroxybiphenol, 2,4'-dihydroxybiphenyl, 2,5-dihydroxybiphenyl, 3,4-dihydroxybiphenyl, etc., the dihydroxydiphenyl oxides, e.g., 2,2'-dihydroxydiphenyl oxide, 3,3'-dihydroxydiphenyl oxide, 4,4'-dihydroxydiphenyl oxide, etc., the dihydroxynaphthalenes, e.g., 1,4-dihydroxynaphthalene, 1,6-dihydroxynaphthalene, etc., and the chlorinated derivatives of such dihydric phenols in which one or more of the hydrogen atoms in the aryl nucleus is replaced with a halogen atom, e.g., fluorine, bromine, iodine, but preferably chlorine, examples of which are chlorohydroquinone, dichlorohydroquinone, bromoresorcinol, fluorocatechol, etc.

Typical examples of aromatic dicarboxylic acids in the form of their dicarbonyl halides which may be used are the acid halides of terephthalc acid, isophthalic acid, terephthalic acid, the diphenic acids, e.g., 2,2'-diphenic acid, 2,4'-diphenic acid, etc., the naphthalene dicarboxylc acids, e.g., 1,4-naphthalene dicarboxylic acid, 1,8-naphthalene dicarboxylic acid, etc., and the halogenated derivatives of such acids, whereby one or more of the hydrogen atoms attached to the aryl nucleus are replaced by a halogen atom, preferably a chlorine atom.

The preferred polyester in accordance with the invention are those having p-phenylene isophthalate units alone or interspersed with p-phenylene terephthalate units where the isophthalate content is at least 60 mole percent of the total of the isophthalate and terephthalate content and preferably between 70 and 100 mole percent. These polyesters will conform to the structural formula

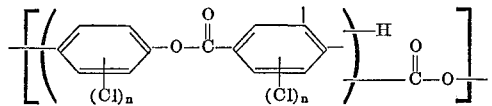

where $n$ is one of the integers 0, 1 or 2. These polyesters are described in detail in the aforesaid U.S. Pat. No. 3,036,990.

One method for forming the polyesters involves reacting a dihydric phenol with a dicarboxylic acid in the form of a carbonyl halide while dissolved in a solvent selected from the group consisting of benzophenone, m-terphenyl, chlorinated biphenyls, e.g. biphenyl having from 1–10 chlorine atoms on the aryl nucleus and mixtures thereof, brominated biphenyls, e.g., biphenyls having from 1–10 bromine atoms on the aryl nucleus and mixtures thereof, chlorinated diphenyl oxides, e.g., diphenyl oxide having from 1–10 bromine atoms on the aryl nucleus and mixtures thereof, chlorinated diphenyl oxdes, e.g., diphenyl oxide having from 1–10 chlorine atoms on the aryl nucleus and mixtures thereof, and brominated diphenyl oxides, e.g., diphenyl oxide having from 1–10 bromine atoms on the aryl nucleus and mixture thereof, at a temperature of from 270° C. up to reflux temperature of the solution until evolution of the hydrohalide ceases. On cooling to about 250° C. or lower, e.g., room temperature, the polymer precipitates from any of these solvents and can be isolated by the simple procedure of spray drying, evaporation of the solvent, centrifugation, of filtering and washing the precipitated polymer free of the solvent by means of a liquid, for example, an aliphatic alcohol, ether, ketone, hydrocarbon, etc., in which the solvent used in the condensation reaction, but not the polymer, is soluble and which can be readily removed from the polymer by evaporation. Examples of such liquids are ethers, for example diethyl ether, methyl ether, methyl ethyl ether, dipropyl ether, etc., ketones, for example, acetone, diisobutyl ketone, methyl ethyl ketone, etc., alcohols, for example, ethyl alcohol, methyl alcohol, amyl alcohol, etc.

Additional details for formation of the superpolyesters contemplated by the invention and a substantial number of additional examples of suitable dihydric phenols and dicarboxylic acids are given in the above referenced U.S. patents, especially U.S. Pat. No. 3,160,602. It should, of course, be obvious that other methods for making linear, aromatic polyesters may exist or be developed and that the invention is not limited to those polyesters prepared by the above described process.

Improved melt stability of the polyesters of the invention is achieved by addition of a styrene polymer. It is believed that the styrene portion of the polymer is responsible for the improvement in melt stability and consequently, the addition of substantially any styrene polymer to the polyester is suitable. It should be noted that monomeric styrene would also be expected to improve melt stability, however, it is an impractical additive as it would be expected to evolve from the polyester composition at the high temperatures required for molding. However, it is included within the scope of the invention.

In view of the above, the term "styrene polymer" is herein defined as monomeric styrene and preferably a polymer containing at least 20% by weight styrene. Consequently, in addition to the polystyrene homopolymer, other suitable styrene polymers include polychlorostyrene, the modified polystyrenes such as rubber modified, high impact polystyrenes, and the styrene containing copolymers such as the styrene-acrylonitrile copolymers (SAN), styrene-butadiene copolymers, styrene-acrylonitrile-alpha-alkyl styrene copolymers, styrene-acrylonitrile-butadiene copolymers (ABS), poly-alpha-methyl styrene, and the like. Other styrene polymers should of course be apparent to those skilled in the art. The preferred styrene polymer is crystal polystyrene.

The amount of styrene polymer added to the polyester is not particularly critical, small amounts providing some improvement and larger amounts providing greater improvement. Desirably, the styrene content of the polyester composition varies between 1 and 10%, greater amounts providing little or no further improvement and frequently, deleteriously affecting various properties of the polyester. For example, where crystal polystyrene is used an amount in excess of 10% by weight, the polyester begins to become embrittled. Where a styrene polymer other than the styrene homopolymer is used, it may be desirable to operate within the lower portion of the concentration range because the remainder of the polymer molecule may have an adverse effect on certain of the polyester properties. This, of course, is dependent upon the particular styrene polymer used.

The method of adding the styrene polymer to the polyester is not critical, conventional prior art dry blending or wet blending techniques being suitable. The invention will be better understood by the following examples wherein all compositions were prepared by wet blending together particulate polyester and styrene polymer.

EXAMPLE 1

Aromatic polyester copolymer comprising 85 mole percent hydroquinone isophthalate and 15 mole percent hydroquinone terephthalate having an intrinsic viscosity of 0.81 deciliter/grams (as measured in 2,4,6-dichlorophenol at 75° C.) was tested in a C. W. Brabender Plasticorder Model PLV 150 using No. 6 rolling blades. In this test, the polymer is melted and the blade rotates in the melted polymer. The torque is a measure of viscosity. If the polymer is not melt stable, viscosity will either increase as will torque showing cross-linking of the polymer or substantially decrease indicating depolymerization. Consequently, using this instrument, it can be seen that melt stability can be determined as a function of measured torque.

The melt curve of the above polymer obtained from this instrument at 760° F. and 60 r.p.m. indicated intermediate and rapid increase in melt viscosity followed by a loss of thermoplastic character of the polymer. A sample of polymer recovered from the Plasticorder after 5 minutes of operation at 760° F. was found to be brittle, insoluble in trichlorophenol and lacking in the toughness characteristic of the original polymer.

EXAMPLE 2

A blend was prepared comprising 90 parts of the polyester of Example 1 and 10 parts of a crystal polystyrene (identified as Lustran polystyrene of Monsanto Chemical Company). The blend was tested as in Example 1 and found to have a lower and constant melt viscosity. Following 60 minutes of running at 760° F., the blend was soluble in trichlorophenol, thermoplastic in character, and possessed good elongation and toughness properties. This period of 60 minutes is well in excess of the time required to extrude and mold a thermoplastic polymer of this type.

EXAMPLE 3

A blend was prepared from 98 parts of the polyester of Example 1 and 2 parts of the crystal polystyrene of Example 2. The blend was tested in the manner described in Example 1. After 30 minutes at 760° F. and 60 r.p.m., the melted polymer was still tough, possessed an intrinsic viscosity of 0.68 dl./g. (as measured at 75° C.) and was soluble in trichlorophenol.

EXAMPLE 4

The polyester of Example 1 was tested in the Plasticorder at 800° F. and was found to gel in less than 5 minutes. Repetition of this procedure using the same polyester containing 5% polystyrene did not result in gelation, but rather, the blend remained tough and soluble in trichlorophenol after 30 minutes at 800° F.

EXAMPLE 5

The procedure of Example 2 may be repeated with similar results using amorphous polystyrene, ABS, or SAN in place of the crystalline polystyrene.

EXAMPLE 6

The procedure of Example 2 may be repeated using an aromatic polyester comprising 100 mole percent hydroquinone isophthalate with similar results.

It should be obvious that modifications can be made to the above-described invention without departing from the scope thereof. For example, various additives such as stabilizers, pigments, plasticizers and the like may be added to the polyester composition.

I claim:

1. A melt stabilized superpolyester composition comprising a major proportion of a linear, aromatic superpolyester of a dihydric phenol and an aromatic dicarboxylic acid having an intrinsic viscosity of at least 0.3 deciliter per gram as measured in 2,4,6-trichlorophenol at 75° C. and a minor amount of a styrene polymer containing at least 20% by weight styrene.

2. The polyester composition of claim 1 where the polyester comprises 100 mole percent p-phenylene isophthalate units.

3. The polyester composition of claim 9 where the styrene content ranges between about 1 and 10 percent by weight of the total composition.

4. The polymer composition of claim 3 where the styrene polymer is selected from the group consisting of the homopolymers of styrene, high impact polystyrene, styreneacrylonitrile-butadiene copolymers and styrene-acrylonitrile copolymers.

5. The polyester composition of claim 3 where the styrene polymer is polystyrene.

6. The polyester composition of claim 10 where the isophthalate content ranges between 70 and 95 moles per cent of the total of the isophthalate and terephthalate content.

7. The polyester composition of claim 10 where the styrene polymer is polystyrene.

8. A melt stabilized superpolyester composition comprising a linear aromatic superpolyester of a dihydric phenol and an aromatic dicarboxylic acid having an intrinsic viscosity of at least 0.3 deciliter per gram as measured in 2,4,6-trichloro phenol at 75° C. and from 1 to 10% by weight of a styrene polymer containing at least 20% by weight styrene.

9. The polyester composition of claim 1 where the superpolyester is of p-phenylene isophthalate units interspersed with p-phenylene terephthalate units and the isophthalate content is at least 60 mole percent of the total of the isophthalate and terephthalate content, said superpolyester having the repeating structure unit

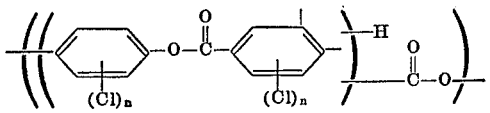

where $n$ is 0, 1 or 2.

10. A melt stabilized polyester composition comprising a linear aromatic superpolyester of p-phenylene isophthalate units interspersed with p-phenylene terephthalate units with the isophthalate content being at least 60 mole percent of the total of the isophthalate and terephthalate content, said superpolyester having the repeating structural unit

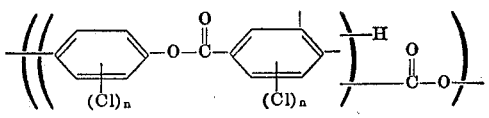

where $n$ is 0, 1 or 2 and an intrinsic viscosity of at least 0.3 deciliter per gram as measured in 2,4,6-trichlorophenol at 75° C. and a styrene polymer containing at least 20% by weight styrene, in an amount whereby the styrene content of the superpolyester composition ranges between about 1 and 10 percent by weight.

References Cited

UNITED STATES PATENTS

| | | | |
|---|---|---|---|
| 3,359,344 | 12/1967 | Fukushima | 260—873 |
| 3,322,854 | 5/1967 | Yasui et al. | 260—873 |
| 3,239,582 | 3/1966 | Keskkula et al. | 260—873 |
| 3,160,602 | 12/1964 | Kantor et al. | 260—860 |
| 3,036,990 | 5/1962 | Kantor et al. | 260—47 |
| 3,564,077 | 2/1971 | Brinkman et al. | 260—873 |

OTHER REFERENCES

Chem. Abstracts, vol. 70: 39013b, Esterol A–G, "Styrene . . . Compositions."

HAROLD D. ANDERSON, Primary Examiner

E. WOODBERRY, Assistant Examiner

U.S. Cl. X.R.

260—31.6